US007960931B2

(12) United States Patent
Rodriguez et al.

(10) Patent No.: US 7,960,931 B2
(45) Date of Patent: Jun. 14, 2011

(54) DIGITAL CONTROL OF MOTOR DRIVES

(75) Inventors: Fernando Rodriguez, Hammond, IN (US); Srdjan M. Lukic, Chicago, IL (US); Ali Emadi, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 429 days.

(21) Appl. No.: 12/214,032

(22) Filed: Jun. 16, 2008

(65) Prior Publication Data

US 2009/0009113 A1 Jan. 8, 2009

Related U.S. Application Data

(60) Provisional application No. 60/934,765, filed on Jun. 15, 2007.

(51) Int. Cl.
*H02P 7/00* (2006.01)
(52) U.S. Cl. .......................... 318/432; 318/433; 318/434
(58) Field of Classification Search .................. 318/432, 318/433, 434, 400.38, 400.34, 400.03, 400.02, 318/16, 17, 599, 600, 701, 606, 538, 568.18; 388/800
See application file for complete search history.

(56) References Cited

U.S. PATENT DOCUMENTS

| | | | |
|---|---|---|---|
| 4,544,868 A | 10/1985 | Murty | |
| 5,107,387 A | 4/1992 | Orton | |
| 5,159,218 A | 10/1992 | Murry et al. | |
| 5,237,540 A | 8/1993 | Malone | |
| 5,249,161 A | 9/1993 | Jones et al. | |
| 5,258,696 A | 11/1993 | Le | |
| 5,334,917 A | 8/1994 | Lind | |
| 5,789,893 A | 8/1998 | Watkins | |
| 5,912,541 A | 6/1999 | Bigler et al. | |
| 5,959,422 A * | 9/1999 | Kang | 318/561 |
| 6,300,736 B1 | 10/2001 | De Winter et al. | |
| 6,300,739 B1 | 10/2001 | Ratliff et al. | |
| 6,316,895 B1 | 11/2001 | Ramarathnam | |
| 6,392,418 B1 | 5/2002 | Mir et al. | |
| 6,479,959 B2 | 11/2002 | Choe | |
| 6,563,284 B2 | 5/2003 | Teutsch et al. | |
| 6,762,575 B2 | 7/2004 | Douglas | |
| 6,949,900 B1 | 9/2005 | Berringer | |
| 7,030,589 B2 | 4/2006 | Kaneko et al. | |
| 7,076,830 B2 | 7/2006 | Conner et al. | |
| 7,095,193 B2 | 8/2006 | Kellogg et al. | |
| 7,193,385 B2 | 3/2007 | Emadi et al. | |
| 7,196,485 B1 | 3/2007 | Lee et al. | |
| 2003/0173924 A1 | 9/2003 | Blase et al. | |
| 2004/0135537 A1 | 7/2004 | Conner et al. | |

OTHER PUBLICATIONS

S. Lukic, Advanced Digital Control Techniques for Switched Reluctance Motor (SRM) Drives, Dissertation, Dec. 1, 2007, 131 pages.

* cited by examiner

*Primary Examiner* — Karen Masih
(74) *Attorney, Agent, or Firm* — Pauley Petersen & Erickson

(57) ABSTRACT

A digital controller for controlling variable speed and dynamic torque applications of an electric motor. The controller includes a state observer monitoring a torque load requirement and sending a signal based on the torque load requirement, and a digital control unit for receiving the signal from the state observer and sending an output to the electric motor. The output is a value that corresponds to a first motor operating state or a second motor operating state.

20 Claims, 11 Drawing Sheets

DIGITAL CONTROL OF MOTOR DRIVES

CROSS REFERENCE TO RELATED APPLICATION(S)

This application claims the benefit of U.S. Provisional Application Ser. No. 60/934,765, filed on 15 Jun. 2007. The co-pending Provisional Application is hereby incorporated by reference herein in its entirety and is made a part hereof, including but not limited to those portions which specifically appear hereinafter.

BACKGROUND OF THE INVENTION

1. Field of the Invention

The present invention relates generally to the control of electric machines. The present invention relates more specifically to the control of electric machines through the digital selection of operating states.

2. Discussion of the Related Art

Advanced electric motor drives are continually gaining popularity in motion control applications, with major users including consumer appliances, industrial machinery, aerospace applications, and automotive applications. Motor drives are used in a broad variety of applications from low-power home appliances such as washing machines, refrigerators, air conditioning, hand power, tools, and cordless drives, robots, fitness machines, and medical instrumentation, to medium-power automotive applications such as electric power steering, active suspension, brake by wire, starter/alternator, and anti-lock braking systems, to high-power industrial motor drives and automation systems, electric and hybrid electric cars, propulsion systems for trains and locomotives, mass transit, movers, machine tools, elevators, pumps, and compressors. For all these applications, it can be desirable to have a low cost, but effective motor speed controller.

Hysteresis (band or bang bang) current control and PWM control are the most widely used speed control techniques for electric motors. Both of these control techniques are analog based but can be easily implemented on analog or digital components since they are well understood. Cost and implementation complexity are often the most important factors for design trade-offs between techniques, implementation, and strategy of motor control hardware. For digital implementation of the aforementioned techniques, microcontrollers, microprocessors, or digital signal processors (DSPs) may be used. However, it is important to note that digital implementation of such a control technique does not produce a true digital controller. Instead, what results is a digitally implemented non-digital control technique.

Commonly assigned U.S. Pat. No. 7,193,385 provides a digital controller for electric machines in which a binary state digital controller deals with the motor drive as a binary state digital system. The controller desirably operates with a binary choice of predefined motor operation states to control speed or torque of the motor, digitally selected by simple IF/THEN logic based upon greater than/less than comparisons of a single operating motor value to a single control parameter.

SUMMARY OF THE INVENTION

The present invention improves upon the work described in U.S. Pat. No. 7,193,385, herein incorporated by reference, on digital control of electric machines. The present invention provides new control designs and control design procedures for various electric machines, such as brush-less DC (BLDC) machines, switched reluctance machines (SRM), Permanent Magnet DC machines, and universal DC machines. For ease of explanation, the electric machine will be described herein as a motor being controlled by the digital controller. Also, an integrated circuit (IC) is contemplated for implementing the digital control for the motors, e.g., a brush-less DC (BLDC) machine. The digital control can be used for many applications, such as home appliances: washing machines, lawn-mowers, ceiling fans, air conditioning units, refrigeration, power tools, etc. Any of the above mentioned motors can be used in these applications.

The general object of the invention can be attained, at least in part, through an electric motor controller for controlling variable speed and dynamic torque applications in an electric motor including a rotor, a stator, a power inverter and a torque load requirement. The controller comprises a state observer monitoring the torque load requirement and sending a signal based on the torque load requirement, and a digital control unit for receiving the signal from the state observer and sending an output to the electric motor, wherein the output is a value that corresponds to a first motor operating state or a second motor operating state.

The invention further comprehends a method of controlling an electric motor in variable speed and dynamic torque applications where the electric motor includes a rotor, a stator, a power inverter and a torque load requirement. The method comprises: sensing a toque load with a state observer and sending a signal based on the torque load requirement; receiving the signal from the state observer in a digital control unit and sending an as output from the digital control unit to a current regulator based on an input from the state observer a first motor operating state or a second motor operating state; and sending a signal from the current regulator to the power inverter of the electric motor based on the output from the digital control unit.

Other objects and advantages will be apparent to those skilled in the art from the following detailed description taken in conjunction with the appended claims and drawings.

DETAILED DESCRIPTION OF THE INVENTION

Figure 1:
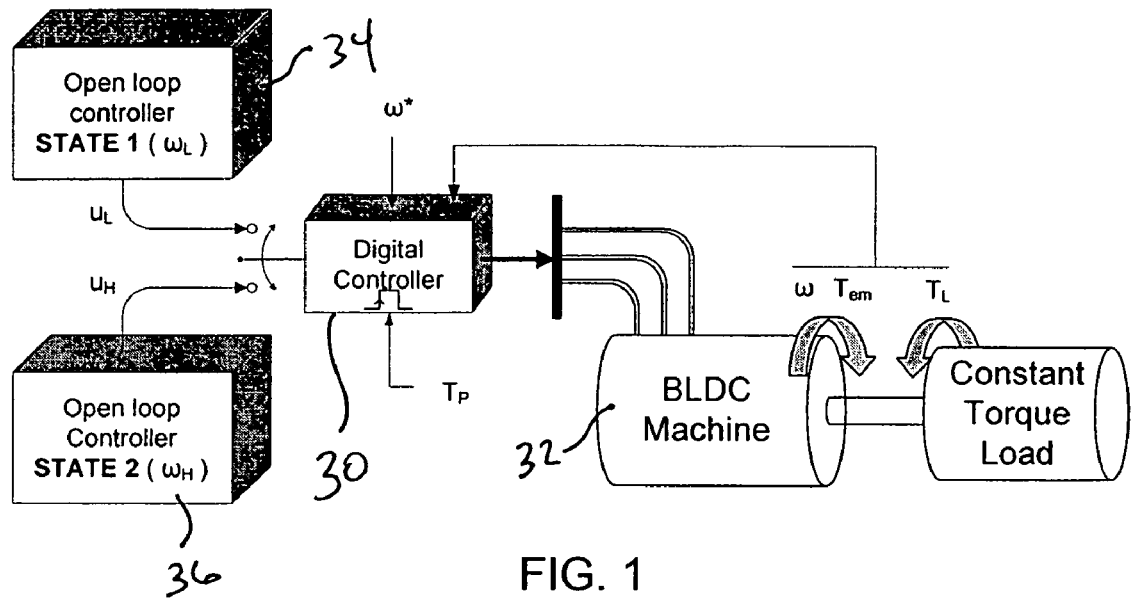
FIG. 1 illustrates an electric motor controller according to one embodiment of this invention.

The present invention provides an electric motor controller for controlling variable speed and dynamic torque applications in an electric motor. The electric motor can be, without limitation, a brush-less DC (BLDC) machines, switched reluctance machines (SRM), Permanent Magnet DC machines, and universal DC machines. The invention will be described below with reference to BLDC and SRM motors.

In one embodiment of this invention, the electric motor includes a rotor, a stator, and a power inverter and has a torque load requirement. The controller includes a state observer that monitors the torque load requirement and sends a signal based on the torque load requirement. A digital control unit receives the signal from the state observer and responds by sending an output to the motor. The output is a value that corresponds to a first motor operating state or a second motor operating state.

Brushless DC Motor Drives

Advancements in motor drive technology along side with power electronics have allowed for high efficiency motor drives to find their way into many types of applications, industrial as well as residential whether it be high power or low power. One such advancement is the introduction of brushless DC (BLDC) machines with trapezoidal back-emf. These machines typically offer a high torque density, require little maintenance, and have much higher efficiencies compared to single phase induction motors. Compared to induction machines, they generally have lower inertia allowing for faster dynamic response to reference commands. Also, they are more efficient due to the permanent magnets which generally results in virtually zero rotor losses. A drawback with BLDC motors is that they typically require a power electronic converter to drive them, which adds system complexity and generally requires a sophisticated controller in order to operate.

Many technical papers describe control methods applied to BLDC motor drives. Hysteresis current control and pulse-width-modulation (PWM) control coupled with continuous control theory produce the most widely used BLDC motor control techniques. Hysteresis current control is essential towards achieving adequate servo performance, namely instantaneously torque response yielding faster speed response compared to PWM control. For most applications, proportional (P) or proportional-integral (PI) current and speed compensators are sufficient to establish a well-regulated speed/torque controller. Though great care must be taken in choosing the bandwidth of the motor drive system since too large of a bandwidth can result in an undesired wind up error due to practical limitations such as a finite power source. In other cases, linear control theory via state feedback using state observers and state tracking filters have been used to achieve more precise control of BLDC motors. Classic control theory and linear system theory are well understood, but are highly complex and require extensive control systems knowledge to develop well design controller. Discrete control theory allows for such controllers to be digitally implemented with micro-controllers, microprocessors, or digital signal processors (DSPs). Digitizing analog controllers serves to add complexity to the overall design procedure.

Sliding mode control (SMC) and variable structure systems (VSS) are other control methodologies. The aforementioned control techniques have certain benefits and drawbacks ranging from performance related to implementation cost. Ideally, SMC and VSS are said to exhibit excellent system performance, insensitivity to plant variations, and absolute disturbance rejection. However, in practice both methods exhibit the problem commonly known as the chattering phenomenon, which is essentially oscillation about an operating point. Also, implementations of SMC techniques have proved costly in terms of DSP implementation due to computationally extensive operations when complemented by adaptive parameter estimation in an effort to reduce the chattering effect.

The present invention provides a new digital control technique for BLDC motor drives, such as those with trapezoidal back-emf. As discussed above, the present makes use of a state observer to estimate the load torque which is used to derive control parameters. The digital controller treats the BLDC motor like a digital system that may only operate at a few predefined states. Those states establish machine operating conditions which produce distinct constant motor speeds. Speed regulation is achieved by alternating states during operation.

The digital controller of this invention treats the BLDC motor like a digital system, which may only operate in two predefined states, namely state-1 and state-2, as shown in FIG. 1. FIG. 1 illustrates a digital control unit, shown as digital controller 30, driving a BLDC motor 32 under a constant torque load. The digital control concept in FIG. 1 is described by incorporating two open loop controllers. The first open loop controller 34 creates state-1 which generates the necessary electromagnetic torque to operate the motor at a speed of low omega ($\omega_L$). Operation in state-2, which is attained with the second open loop controller 36, results in a motor speed of high omega ($\omega_H$).

Under the constraint that $\omega_H$ is greater than $\omega_L$, when the commanded speed is $\omega^*$, where $\omega_L < \omega^* < \omega_H$, the digital controller will achieve speed regulation by appropriately alternating states. In other words, the digital controller 30 compares the motor speed to the commanded speed and determines which actuation signal, (either $u_L$ or $u_H$) to apply to the BLDC machine 32. Therefore, the digital controller 30 simply follows a couple of IF and THEN statements that are very straightforward:

1) If motor speed is less than commanded speed, then switch or stay at state-2 ($\omega_H$).

2) If motor speed is greater than commanded speed, then switch or stay at state-1 ($\omega_L$).

Various and alternative methods are available for achieving the two states 34 and 36 of operation. For example, two such methods are Conduction Angle Control and Current Mode Control. The term Conduction-Angle Control stems from the definitions of State-1 and State-2. Conduction angle control is very similar to Hysteresis current control, in that it is necessary to define a current band as well as $\theta_1$ and $\theta_2$, see FIG. 2.

Figure 2:
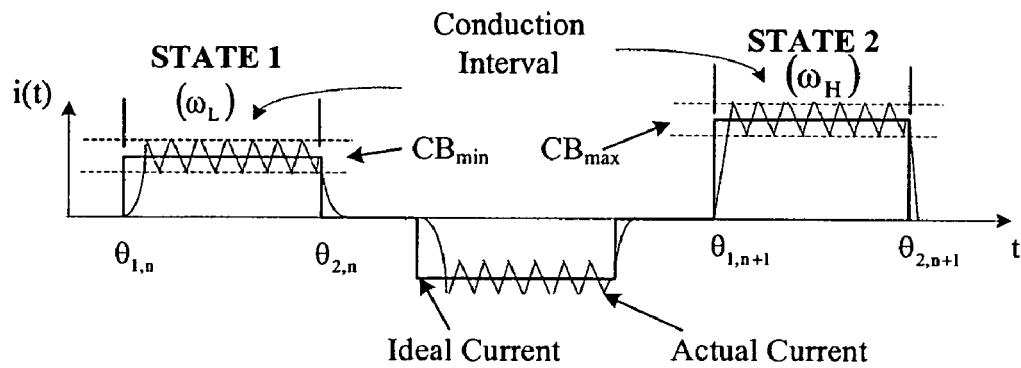
FIG. 2 is a graphical illustration of current mode control state definitions.

Once those parameters are appropriately defined for a given BLDC motor, the motor can be operated at a fixed speed. However, there is a need for speed control; therefore, two states are defined in order to produce $\omega_L$ and $\omega_H$, as required by the digital controller. These states are produced by assigning two distinct values to $\theta_2$, namely $\theta_{2,min}$ and $\theta_{2,max}$, while maintaining the current band and $\theta_1$ constant, as shown in FIG. 2. When the motor is operated with $\theta_2=\theta_{2,min}$, a fixed speed of $\omega_L$ results; current is injected into the motor for only part of the conduction interval. When $\theta_2=\theta_{2,max}$, the fixed speed of $\omega_H$ results since current is injected for the entire conduction interval. When a commanded speed ($\omega^*$) is given, where $\omega_L \leq \omega^* \leq \omega_H$, the digital control unit will use the rules mentioned above to regulate the motor speed. In order to develop a simple design scheme for the digital control unit, $\theta_1$ is always set to the beginning of the conduction interval and $\theta_{2,max}$ is fixed to the ending of the conduction interval.

Figure 3:
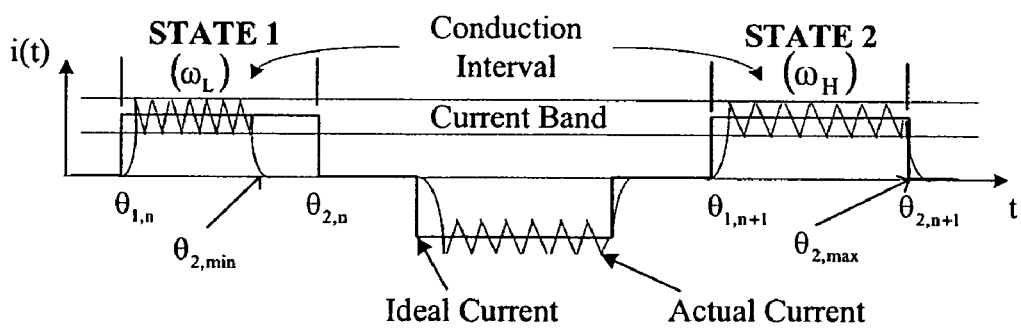
FIG. 3 is a graphical illustration of conduction angle control state definitions.

Current-mode control is also very similar to hysteresis current control. For this control technique, the three hysteresis current control parameters (current band, $\theta_1$, and $\theta_2$) are once again defined, see FIG. 3. However, $\theta_1$ and $\theta_2$ are held constant while the current band (CB) is given two distinct values, namely $CB_{min}$ and $CB_{max}$. These values serve to produce the two necessary states in order to carry out the proposed digital control. FIG. 3 illustrates the two states and as with the conduction-angle control, State 1 produces $\omega_L$ while State 2 yields $\omega_H$. When a commanded speed ($\omega^*$) is given, where $\omega_L \leq \omega^* \leq \omega_H$, the digital controller can regulate the motor's speed by following the rules mention earlier. In the description below, Current Mode Control is employed which results in the actuation signals $u_H$ and $u_L$ taking the form of current signal.

Referring to the design shown in FIG. 1, at every controller 30 sampling instance, $t=kT_P$, the controller 30 must decide which actuation signal ($u_i$, i=H or L) to apply to the BLDC machine 32. Therefore, it is necessary to define what the actuation signal is and how to determine the quantitative values that will produce the appropriate motor speeds. Operating conditions of the motor and motor drive system must be defined for $\omega_L$ and $\omega_H$. The first step was to find the equation for angular velocity as a function of the operating parameters under steady state conditions. To do so, Newton's 2nd law applied to rotary motion was used:

$$T_{em}(t) = \omega(t)b + J\frac{d\omega(t)}{dt} + T_L(t) \quad (1)$$

where, $T_{em}(t)$=developed electromagnetic torque
$\omega(t)$=rotor speed
b=viscous friction damping constant
J=rotor inertia
$T_L(t)$=load torque.

The BLDC motor 32 according to this invention operates in two predefined States 34 and 36. Within those States 34 and 36 and under steady state conditions, the load torque and the developed torque will be constant. Even though alternating of states may occur at every sampling time $t=kT_P$, it is reasonable to assume that the developed mechanical torque will be in steady state. That assumption is made based on an inherent characteristic of most electromechanical systems. Electromechanical systems consist of an electrical and a mechanical subsystems whose dynamics are coupled in some manner. In the case of a BLDC machine, the coupling occurs via the linear relation between the motor's active phase currents and the developed electromagnetic torque. The dynamics associated with the motor's phase current are at least an order of magnitude faster than that of the mechanical dynamics. Therefore, it is safe to assume that alternating states results in instantaneous alternating of developed electromagnetic torque relative to the mechanical dynamics. Given the aforementioned, Equation (1) is written to form (2), a first order non-homogeneous differential equation. Assuming an average electromagnetic torque and a constant load torque, the solution to the differential equation gives the instantaneous speed as a function of motor parameters and load conditions, see Equation (3):

$$\frac{d\omega(t)}{dt} + \frac{b}{J}\omega(t) = \frac{T_{em} - T_L}{J} \quad (2)$$

$$\omega(t) = \frac{T_{em} - T_L}{b} + \left(\omega(0) - \frac{T_{em} - T_L}{b}\right)e^{-(b/J)t} \quad (3)$$

The mechanical time constant ($\tau_m$) is defined as the ratio of the moment of inertia to the viscous friction constant. Substitution of $\tau_m$ into Equation (3), along with setting time approaching infinity results in Equation (4). The steady state motor speed is described as a function of the rotor inertia and the mechanical time constant.

$$\omega(t \to \infty) = \omega_{steady\ state} = \frac{T_{em} - T_L}{J}\tau_m \quad (4)$$

Equation (4) defines the steady state angular velocity as a function of the motor mechanical parameters. However, rotor speed control is accomplished via applied voltage and the resulting current. The induced torque is proportional to the instantaneous per phase current as defined in Equation (5). The current is assumed to be constant since operation is in steady state.

$$T_{em} = k_{ta}i_a + k_{tb}i_b + k_{tc}i_c \approx K_t I \quad (5)$$

where, $T_{em}$=developed electromagnetic torque
$k_{ti}$=phase torque sensitivity (i=a, b, c)
$i_i$=phase currents (i=a, b, c)
$K_t$=peak value of torque sensitivity
I=approximate steady state current.

Equation (5) is substituted into Equation (4) and solved for the average current. The equation for the current is a function of the desired steady state rotor speed, see Equation (6). It can be used to find the necessary current to produce $\omega_L$ and $\omega_H$ for a given load.

$$I(\omega_{ss}) = \frac{1}{k_t}\left(\frac{J}{\tau_m}\omega_{ss} + T_L\right) \quad (6)$$

Equation (6) provides a closed form equation to determine the appropriate operating current values, which are in fact the actuation signals that produce the electromagnetic torque. Those two current are defined by Equations (7) and (8):

$$I_H = \frac{1}{k_t}\left(\frac{J}{\tau_m}\omega_H + T_L\right) \quad (7)$$

$$I_L = \frac{1}{k_t}\left(\frac{J}{\tau_m}\omega_L + T_L\right) \quad (8)$$

Figure 4:
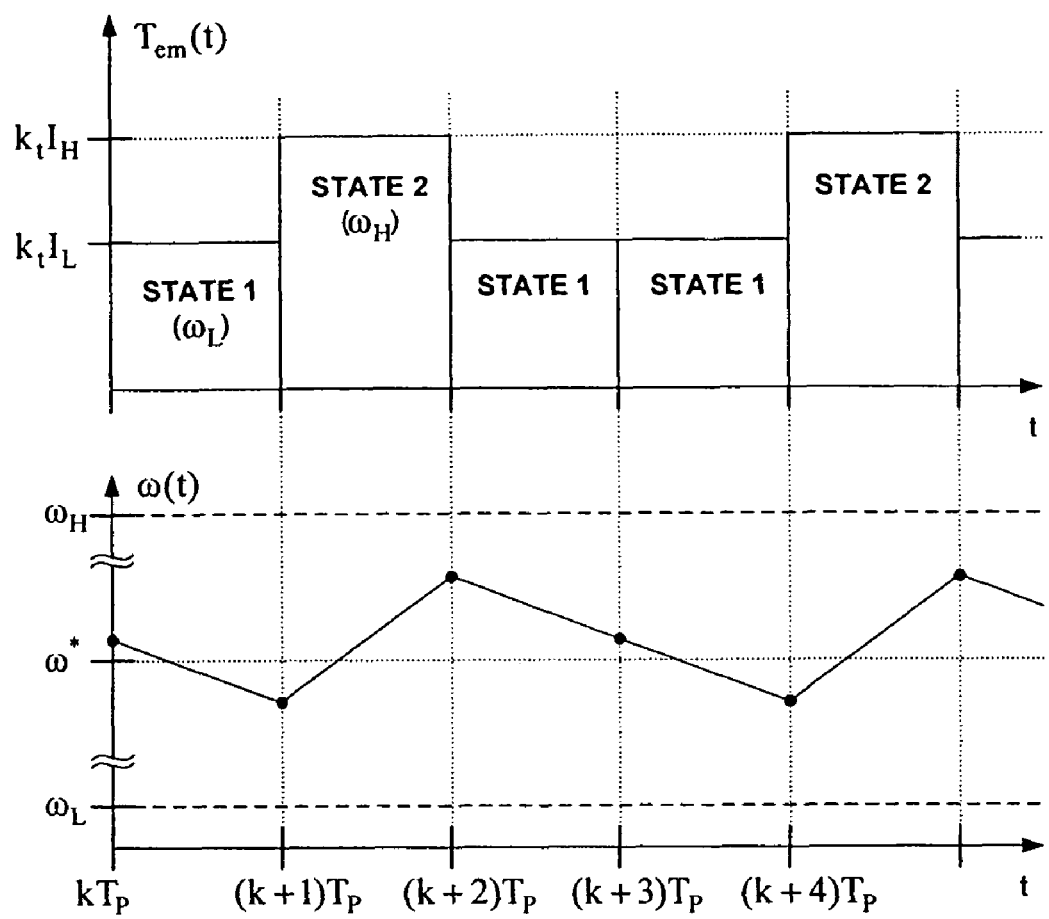
FIG. 4 is a graphical illustration of electromagnetic torque produced by a digital controller of this invention.

The required currents are defined in terms of the motor parameters and the load torque. For a given BLDC machine, the required parameters are readily available from the manufacturer's data sheet. Load torque is assumed to be known. Therefore, what results is a mechanical system which draws parallels to a power electronic buck converter. FIG. 4 depicts the electromagnetic torque produced by the digital controller 30. At every sampling instance, the controller 30 will inject current into the motor 32 so as to produce a high torque or a low torque period. Motor operation in State-1 results in a motor speed of $\omega_L$ and State -2 produces $\omega_H$. By exploiting the slow mechanical dynamics relative to the electrical dynamics, fast alternating of states results in an average speed that is equal to the command speed. Electromagnetic torque is undergoing hard switching, however like the L-C filter in a buck converter, the rotor and load inertia serve to filter the "noisy" torque into and average torque as depicted in FIG. 4. Also shown in the figure is the behavior of the rotor speed during the hard switching.

Motor speed ripple will largely depend on the period $T_P$, therefore a relation between the ripple and the period must be established. To do so, Equation (3) is re-written with a couple of substitutions. The difference between the electromagnetic torque and the load torque is defined as the net torque ($T_N = T_{em} - T_L$). Also, the mechanical time constant ($\tau_m$) is incorporated into the equation to form Equation (9).

$$\omega(t) = \frac{T_N}{J}\tau_m + \left(\omega(0) - \frac{T_N}{J}\tau_m\right)e^{-t/\tau_m} \qquad (9)$$

where, $T_N$=net torque
$\tau_m$=rotor speed

For an arbitrary initial condition, at the time equal to $T_P$ the equation becomes:

$$\omega(t = T_P) = \omega(0) + \delta\omega = \frac{T_N}{J}\tau_m + \left(\omega(0) - \frac{T_N}{J}\tau_m\right)e^{-T_P/\tau_m} \qquad (10)$$

Equation (10) is solved for the period by solving for the exponential term, which results in Equation (11).

$$e^{-T_P/\tau_m} = \frac{\omega(0) + \delta\omega - \frac{T_N}{J}\tau_m}{\omega(0) - \frac{T_N}{J}\tau_m} \qquad (11)$$

The natural log of both sides of the equation is taken and the equality is solved for $T_P$ to yield Equation (12).

$$T_P = -\tau_m \mathrm{Ln}\left(\frac{\omega(0) + \delta\omega - \frac{T_N}{J}\tau_m}{\omega(0) - \frac{T_N}{J}\tau_m}\right) \qquad (12)$$

Equation (12) states that given a desired deviation in speed ($\delta\omega$) for any initial speed condition, the sampling or period can be directly calculated. However, the deviation in speed used to find the period is only for switching from one particular state to the other. There is speed deviation from the desired speed that is contributed from both states. Therefore, to find the period necessary to limit the overall ripple $\Delta\omega$, speed deviations from both state must be considered.

Figure 5:
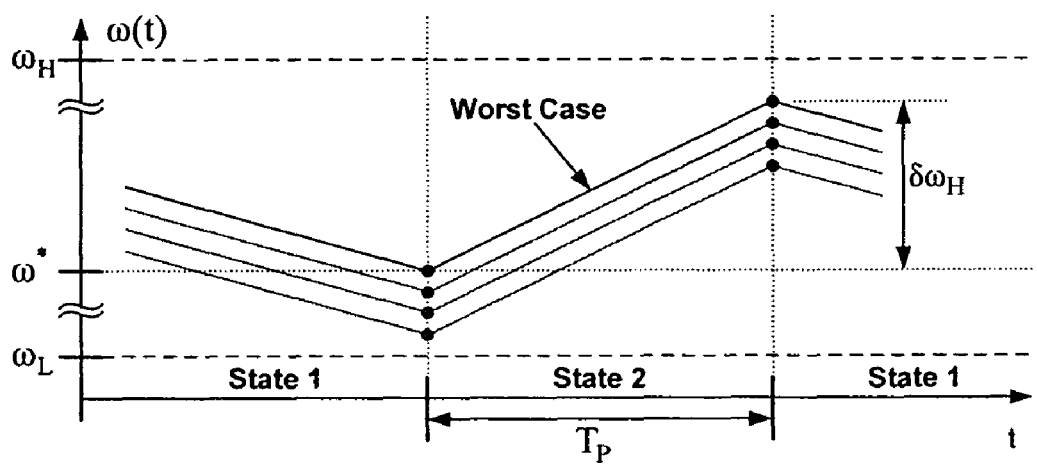
FIG. 5 is a graphical illustration of speed ripple contribution from a state 2.
Figure 6:
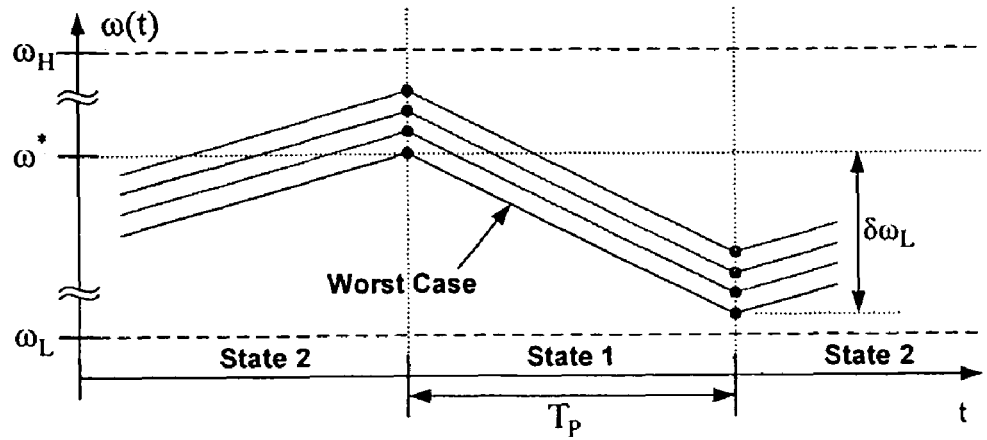
FIG. 6 is a graphical illustration of speed ripple contribution from a state 1.

FIG. 5 along with Equation 12 are used to determine the necessary period that results in a desired overall speed ripple or change in speed ($\Delta\omega$). FIG. 5 reveals several instantaneous speed waveform possibilities. At the beginning of an arbitrary sampling time, when alternating from State-1 to State-2, the instantaneous speed will become less than the commanded speed. The controller 30 will then switch states and the speed will begin to increase towards a fixed net value of $\delta\omega_H$. The largest speed deviation from the commanded speed results when switching of states occurs if $\omega(t)=\omega^*-\epsilon$, where $\epsilon \to 0$. The equation for that condition is given by Equation (13). A similar argument can be made to reveal the worst case speed deviation when alternating from State-2 to State-1, see Equation (14).

Now that the speed deviation contributions resulting from switching have been found, the overall speed ripple is derived. Equation (13) is subtracted from Equation (14), which results in Equation (15).

$$\omega(t = T_P) = \omega^* + \delta\omega_H \qquad (13)$$
$$= \frac{K_t I_H - T_L}{J}\tau_m(1 - e^{-T_P/\tau_m}) + \omega^* e^{-T_P/\tau_m}$$

$$\omega(t = T_P) = \omega^* - \delta\omega_L \qquad (14)$$
$$= \frac{K_t I_L - T_L}{J}\tau_m(1 - e^{-T_P/\tau_m}) + \omega^* e^{-T_P/\tau_m}$$

where, $$\delta\omega_L = \text{speed deviation from } \omega^* \text{ during state-1} \qquad (15)$$
$$\delta\omega_H = \text{speed deviation from } \omega^* \text{ during state-2}$$
$$\Delta\omega = \omega^* + \delta\omega_H - \omega^* + \delta\omega_L$$
$$= \left(\frac{K_t I_H - T_L}{J}\tau_m - \frac{K_t I_L - T_L}{J}\tau_m\right) \cdot$$
$$(1 - e^{-T_P/\tau_m}) + \omega^* e^{-T_P/\tau_m} - \omega^* e^{-T_P/\tau_m}$$

Simplification of Equation (15) yields the overall ripple as a function of the period ($T_P$), see Equation (16).

$$\Delta\omega = (\omega_H - \omega_L)(1 - e^{-T_P/\tau_m}) \qquad (16)$$

If the period is forced towards zero ($T_P \to 0$) resulting in infinitely fast sampling, the speed ripple is reduced to zero as indicated by Equation (17).

$$\Delta\omega = (\omega_H - \omega_L)(1 - e^{-0/\tau_m}) = 0 \qquad (17)$$

On the other hand, when the period is forced towards infinity ($T_P \to \infty$), the speed ripple reaches the maximum value, see Equation (18).

$$\Delta\omega = (\omega_H - \omega_L)(1 - e^{-\infty/\tau_m}) = \omega_H - \omega_L \qquad (18)$$

Equation (16) is solved for the period to give a simplified relation to the speed ripple, see Equation (19). A relation between the overall speed ripple and the period has been established.

$$T_P = -\tau_m \mathrm{Ln}\left(1 - \frac{\Delta\omega}{\omega_H - \omega_L}\right), \Delta\omega < \omega_H - \omega_L \qquad (19)$$

Figure 7:
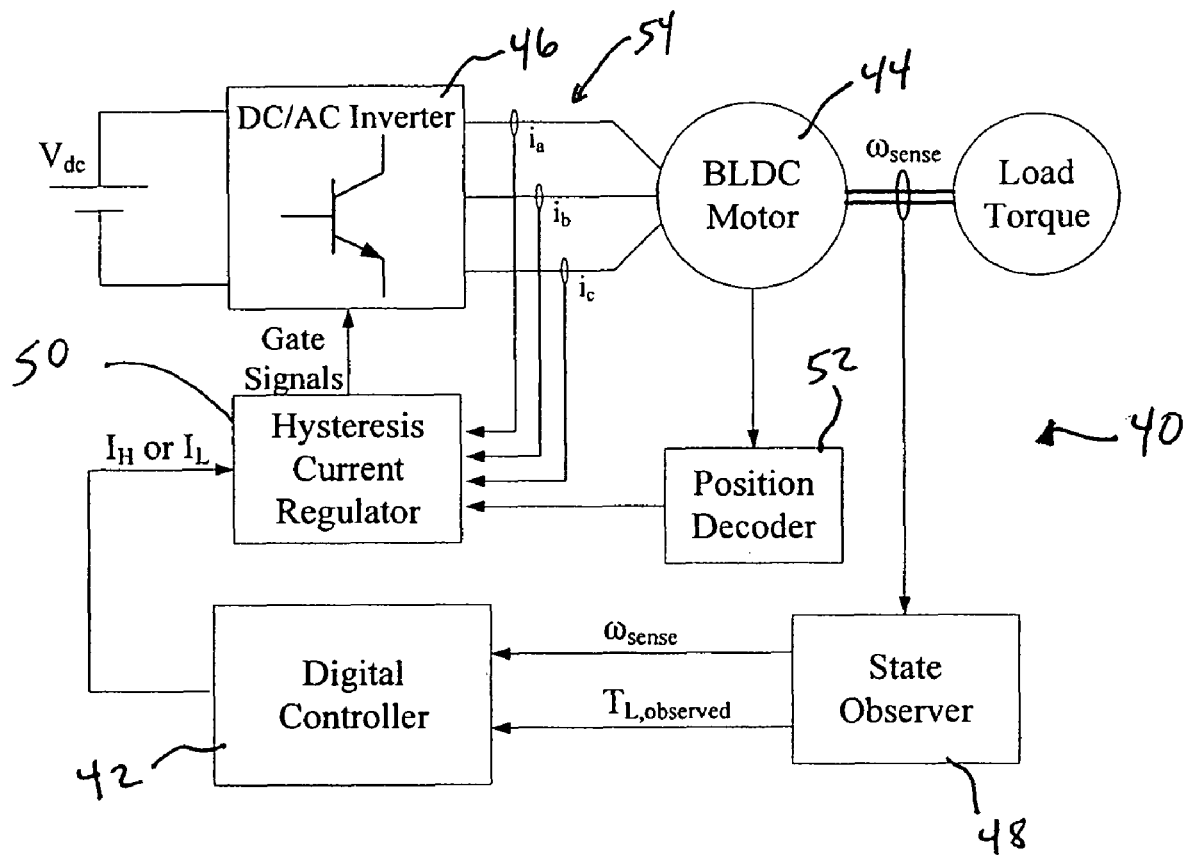
FIG. 7 illustrates an electric motor controller according to another embodiment of this invention.

The above discussion was carried out under the assumption that the load torque was constant and therefore under steady state operation. Even under a dynamic load, the controller of this invention can regulate speed with the use of a state observer. The state observer of this invention is employed to calculate what the load torque is in an automated way. FIG. 7 is a block diagram illustrating an electric drive system 40 and the communication between a digital control unit, i.e., digital controller 42, and the rest of the electric drive system 40.

In the embodiment of the invention shown in FIG. 7, the electric drive system 40 includes electric BLDC motor 44 with a rotor and a stator (not shown), an AC/DC power inverter 46. A state observer 48 monitors the torque load requirement and sends a signal based on the torque load requirement to the digital controller 42. The controller 42 requires speed feedback as well as the observed torque extracted from the state observer 48. The controller 42 then produces an actuation signal, either $I_H$ or $I_L$, in order to produce the appropriate operating state. A current regulator 50, which can be part of or separate from the controller 42, receives the output actuation signal from the digital controller 42 and sends an instruction to the power inverter 46 of the electric motor based on the controller output. The electric drive system further includes a position decoder 52 in orientation determining communication with at least one of the rotor and the stator of the BLDC motor 44, and in signal communication with the current regulator 50. The current regulator 50 takes the actuation signal along with rotor position information to fire the solid state switches accordingly. A current sensor 54 monitors each phase of the power inverter and is in signal communication with the current regulator.

Figure 8:
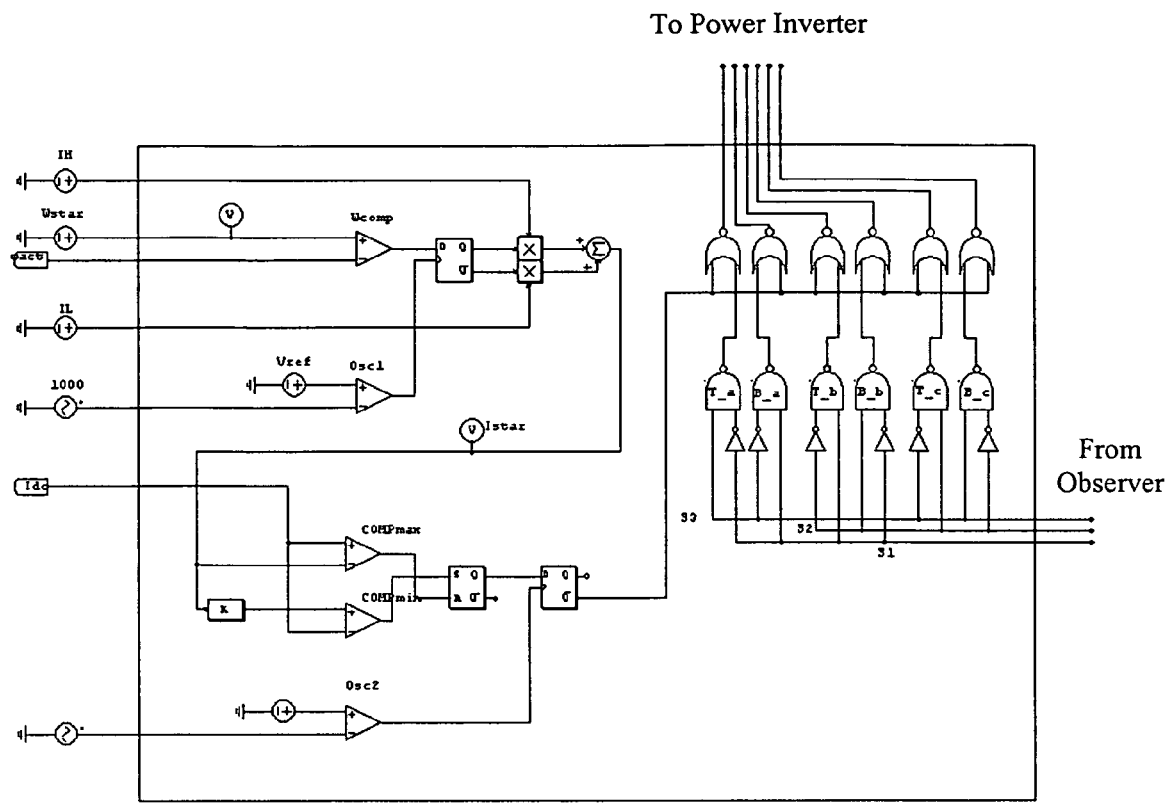
FIG. 8 illustrates a representation of an exemplary integrated circuit (IC) architecture for the digital controller of one embodiment of this invention.
Figure 9:
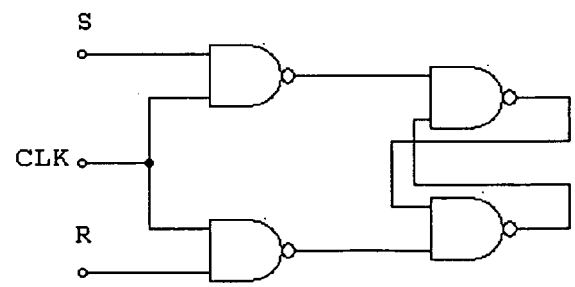
FIGS. 9 and 10 illustrate exemplary portions of the IC architecture of this invention.
Figure 10:
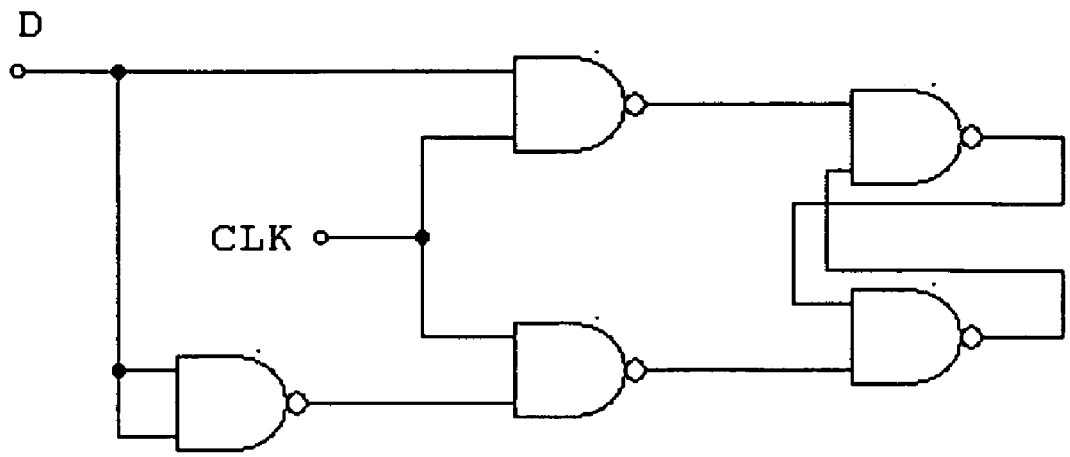

In one embodiment the digital controller 42 includes an integrated circuit (IC). formed of logic gates, flip flops/oscillators, and comparators. There is also desirably a multiplier that can be implemented with a couple of resistors. A representation of an exemplary IC architecture is shown in FIG. 8. The IC shown in FIG. 8 desirably incorporates/provides the hysteresis current regulator 50 shown in FIG. 7. The IC of FIG. 8 includes twelve NAND Gates and six NOT Gates. The twelve NAND gates are utilized to convert the sensor signals into switching signals for the dc to ac inverter. The six NOT gates are implemented with six of the NAND gates. In the IC, two comparators units are used to implement Hysteresis current control and a third is used to compare the speed feedback to the actual speed. The S-R Flip Flop is implemented with four NAND gates, as shown in FIG. 9. The D Flip Flop is implemented with four NAND gates as shown in FIG. 10. Each oscillator in FIG. 10 serves to limit the switching frequency of the comparators. That in turn limits the switching of the STATES ($\omega_H$ and $\omega_L$) and the Hysteresis current switching.

Figure 11:
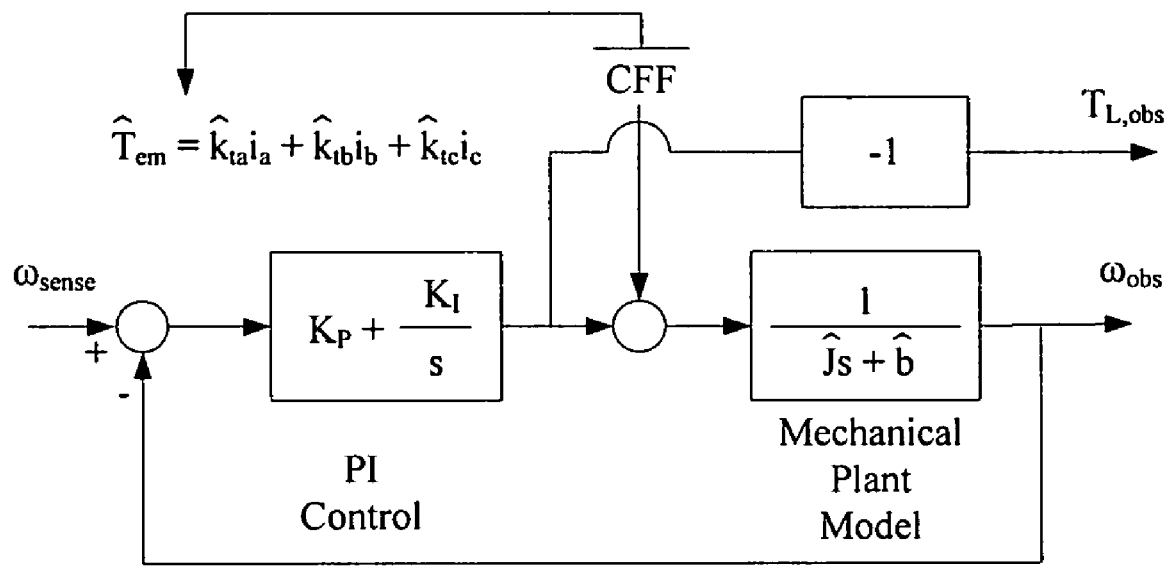
FIG. 11 illustrates a state observer block diagram incorporating command feed forward strategy according to one embodiment of this invention.

FIG. 11 is a block diagram of the state observer 48 used to calculate the load torque. To improve the accuracy of the state observer 48, a command feedforward (CFF) strategy is optionally used. Using CFF ensures a minimum phase lag between the actual states and the observed states. The CFF signal is the estimated electromagnetic torque which is calculated as the sum of the phase currents multiplied by their respective torque sensitivity estimates.

Figure 12:
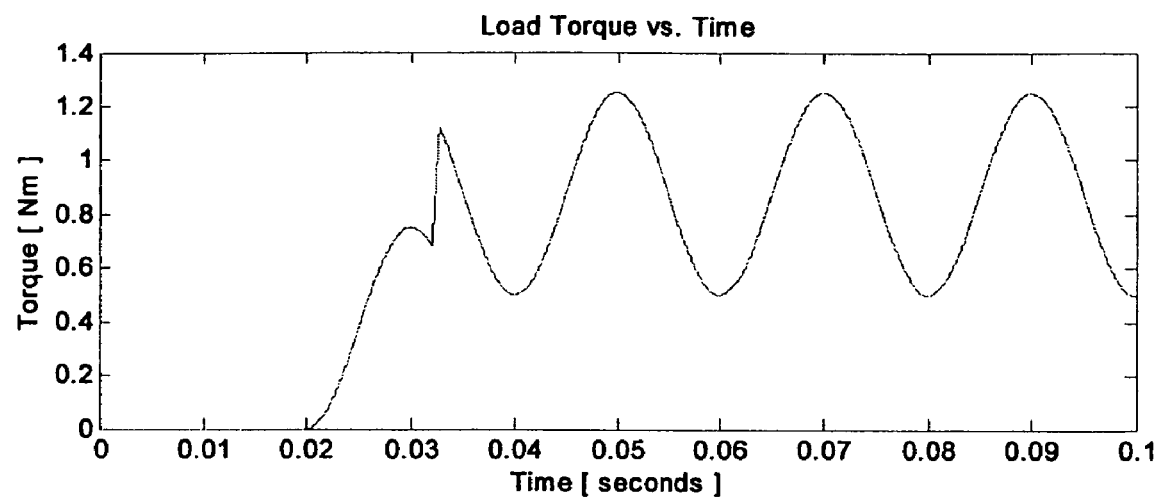
FIG. 12 is a graphical representation of load torque applied during simulations.

The state observer 48 serves to mimic the mechanical plant in order to estimate the states of the system from the sensed state or system output, i.e., the sensed state is shaft speed. When the PI controller is properly tuned and the motor inertia and viscous friction constant are accurately modeled, the output of the PI must be equal to the negative of the load torque. Therefore, the observed load torque can be extracted from the state observer 48 as depicted in FIG. 12. The first step towards tuning the PI controller gains is to chose the PI time constant, $\tau_{PI}=K_P/K_I$, so that it is equal to the estimated mechanical time constant $\tau_m=J/b$. This pole zero cancellation will be exact since the observer is realized as software in the absence of noise. Given the pole zero cancellation, a single pole at the origin remains with one degree of freedom in choosing the closed loop pole location through the choice of the integral gain $K_I$. The design equations resulting from the described tuning methodology are given in Equations (20) and (21), where $f_{b\omega}$ is the desired frequency bandwidth.

$$K_P = 2\pi f_{b\omega} J \quad (20)$$

$$K_I = 2\pi f_{b\omega} b \quad (21)$$

A MATLAB/Simulink model was implemented to demonstrate the digital control unit of this invention. The first step was to define a detailed system-level block diagram which outlined the communication between the controller and the rest of the electric drive system according to FIG. 7. Then, an ideal motor of a three-phase four pole BLDC motor was created. Last, the digital controller and auxiliary blocks were created with the following characteristics. The digital controller requires speed feedback as well as the observed torque extracted from the state observer. The digital controller then produced the actuation signal, either $I_H$ or $I_L$, in order to produce the appropriate operating state. The hysteresis current regulator takes the actuation signal along with rotor position information to fire the solid state switches accordingly.

The developed Simulink model was used to test the performance of a BLDC machine. The BLDC motor modeled was a 459 Watt motor from Poly-Scientific whose parameters is readily available in the manufacturer's motor datasheet and listed in Table 1.

TABLE 1

| BLDC motor parameters (model #: BN34-45EU-01). | | |
|---|---|---|
| Parameter | Value | Units |
| Terminal Velocity | 24 | Volts DC |
| Peak Torque | 7.56 | Nm |
| Continuous Stall Torque | 1.54 | Nm |
| Rated Speed | 3300 | rpm |
| Rated Torque | 1.33 | Nm |
| Rated Current | 23 | Amps |
| Rated Power | 459 | Watts |
| Torque Sensitivity | 0.0653 | Nm/amps |
| Back-emf | 6.83 | Volts/krpm |
| Terminal Resistance | 0.069 | ohms |
| Terminal Inductance | 0.200 | mH |
| Motor Constant | 0.275 | Nm/sq.rt.watt |
| Rotor Inertia | $1,271\ e^{-4}$ | Kg-m$^2$ |

With the motor parameters, the derived above equations were used to calculate the controller parameters. Equation (19) was used to calculate the period for the desired speed ripple. Also, Equations (7) and (8) were embedded in the Simulink block "Digital Control" in order to calculate the high and low currents with load torque information taken from the state observer. The high and low speeds for the simulations were chosen as $\omega_H$=rated speed and $\omega_L$=zero speed. The speed ripple was desired to be minimal, therefore the period was calculated using Equation (19) so as to result in a speed ripple less than a couple of tenths of a percent. The last design step was to tune the state observer with Equations (20) and (21).

Figure 13:
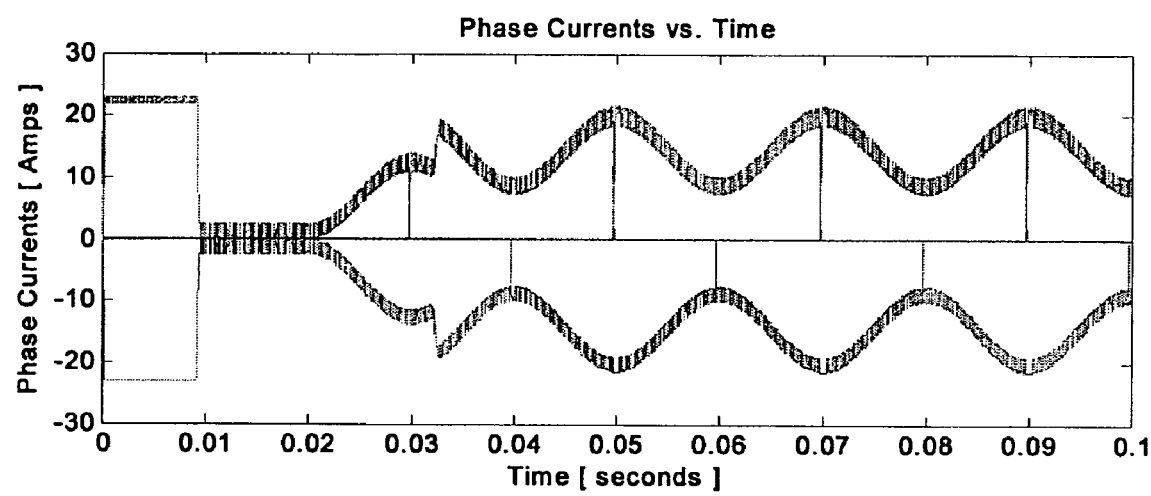
FIG. 13 is a graphical representation of resulting motor phase currents due to applied torque.

The bandwidth chosen for the state observer was that of 10 kHz. As the observer is realized completely in software and immune to noise, the only limiting factor for the bandwidth of this state observer is the resolution of the DSP realizing the state observer. The proportional and integral gains calculated to achieve a 10 kHz bandwidth are $K_I$=29.04 and $K_P$=7.99. The calculated parameters were incorporated into the SimuLink model and a time varying load was applied to test how well the controller regulates speed in the presence of disturbances. The applied load was defined by Equation (22) and consisted of a sinusoidal load disturbance with the addition of a steep ramp increase shortly after thirty milliseconds, see FIG. 12. A reference speed of 1000 rpm was given and the resulting phase current and speed curves are shown in FIGS. 13 and 14, respectively.

$$T_L = \begin{cases} 0, & t < 0.02 \\ 0.375 + 0.375\sin\left(\dfrac{\omega(t-0.02) - }{\pi/2}\right), & t < 0.02 \\ 0, & t < 0.032 \\ +750(t - 03032), & 0.0320 < t < 0.0327 \\ 0.5 & t > 0.0327 \end{cases} \quad (22)$$

Figure 14:
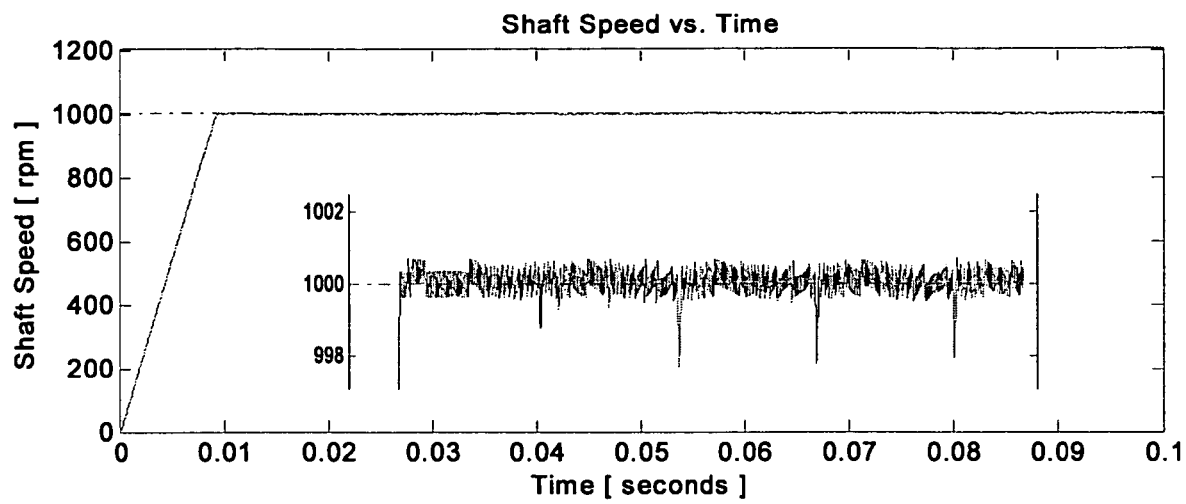
FIG. 14 is a graphical representation of rotor speed with the digital control of this invention under dynamic load disturbances.

FIG. 14 demonstrates that the digital control of this invention is capable of achieving precise speed regulation under dynamic load disturbances. The high and low actuating signals (currents) are continuously updated with the load estimation provided by the state estimator, which allows for the precise speed regulation.

Switched Reluctance Motor Drives

The simplicity of design and robustness of the switched reluctance motors (SRM) make the machines an attractive choice for numerous motor drive applications where price, fault tolerance, and efficient high speed operation are important. With its passive rotor and concentric windings on the stator, SRM is the simplest of all electrical motors. Its standard converter has no chance of shoot through fault, and the machine is able to operate even with a failed phase. On the other hand, due to nonlinearity in magnetic flux linkage, the control of the machine is difficult since linear control methodologies cannot be applied directly. It has been noted that the lack of a simple control method is one of the main obstacles to the widespread use of the motor in industry.

Current methodologies of SRM control can broadly be classified as either memory or processor intensive. All memory intensive methodologies, as well as some processor intensive approaches require detailed motor-specific finite element analysis (FEA) information. In these cases, motor control is only as good as the knowledge of motor parameters and parameter variations. Iterative learning and other on-line optimization methodologies may not need detailed FEA analysis but still require good first estimates. Better memory and processor intensive control solutions are capable of servo motor control at all speeds. However, these solutions are not appropriate for simple low cost applications since the cost and the complexity of the controller cannot be justified.

Researches have tried to address the need for simple, low cost controllers for SRM's. Sliding mode and simple PI control have been proposed as the most viable solutions. Due to the non-linearity of the motor the PI has to be slow to ensure stability. Also, both sliding mode and PI controllers are only capable of controlling the motor at low speeds. Therefore, there is a need for a simple low-cost controller capable of operating over the entire speed range.

The digital control unit and control methodology of this invention simplifies the control problem by allowing the motor to operate in one of two predefined states. The motor operating point is controlled by switching the states to ensure that the motor is at the required operating point. This research defines the relationship between the choice of the states and the performance of the motor, given a reference value for the motor state.

Figure 15:
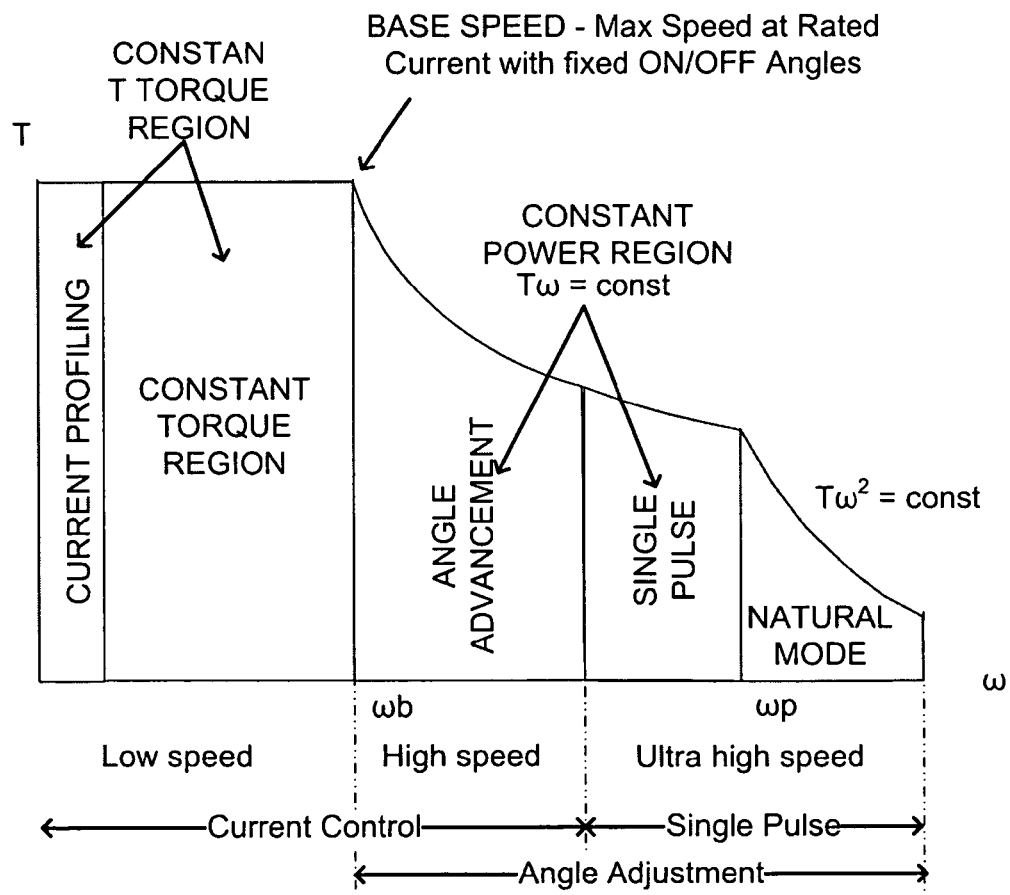
FIG. 15 illustrates a typical torque vs. speed characteristic of SRM.

When stator winding on a SRM is energized, reluctance torque is produced by the tendency of the rotor to move towards the position of minimum reluctance—that is to align with the energized stator phase. Therefore it is important to energize the poles of the SRM at the appropriate rotor positions. Rotation is produced by energizing the stator phases sequentially. Depending on the rotor speed and torque, the timings as well as amplitudes of phase energizing need to be considered to ensure the motor can be controlled throughout the motor torque/speed range. As shown in FIG. 15, distinct regions of operation can be defined by their excitation characteristics.

At low speeds, the motor is controlled by fixing the conduction angles, and varying the excitation current. The angles can be fixed at their current or flux critical angles, or by other optimization method. At higher speeds, due to the higher back EMF, there is a need for angle advancement mainly due to the increase in the back EMF which is a function of speed. Thus: 1) for any motor speed the optimal excitation angles do not change significantly as a function of torque, and do not vary drastically at all for speeds below the "single pulse mode" region; 2) at any operating point the torque production is completely defined by (θON, θOFF, and IREF); and 3) for any operating point the torque production can be optimized based on a certain performance optimization criteria.

The concept employed in the digital control according to this invention is that the difference between the commanded and actuation signal can be brought to zero by commanding either a high energy or a low energy actuation signal (state). One state increases the value of the signal that is being fed back while the other reduces it depending on the value of the feedback error. Therefore, regardless of the sign of the error, the error can be brought to zero by sliding along surface defined by the signal error. Due to its simplicity, the control can be implemented using analog components. The goal is to define the HIGH/LOW actuation signals to ensure that these signals are able to move the operating point to the designated reference.

To apply the digital control concept of this invention to SRMs, motor states need to be defined in terms of controllable motor parameters. Starting from the torque equation of any motor given by Equation (23), the steady state speed can be derived as shown by Equation (24):

$$T_e(t) = B\omega(t) + J\omega^*(t) + T_L(t) \quad (23)$$

$$\omega_{ss} = \dfrac{T_e - T_L}{J}\tau_m = \dfrac{T_e - T_L}{B}; \quad (24)$$

where J is the motor inertia, B is the friction coefficient, ω is the motor speed, Te and TL are the produced and load torques respectively, and $\tau_m$=J/B. Assuming that the torque load is known and zero, without the loss of generality:

$$\omega_{ss} = \dfrac{T_e}{B} \quad (25)$$

It is important to note that the speed of any machine can be controlled by this mechanical loop equation if the load torque is known and if it is possible to actuate the electromagnetic torque Te.

At lower speeds the optimal turn on and turn off angles do not change substantially. Therefore it is possible to define the two digital states which differ only in reference current. A state can be defined where $\hat{T}_e$ is the total torque produced in one stroke as:

$$\hat{T}_e(\theta_{ON},\theta_{OFF},1_{REF})=\text{const} \quad (26)$$

Looking at the instantaneous torque Te:

$$Te = \frac{\partial \int \psi di}{\partial \theta} \approx \frac{1}{2}i^2 \frac{\partial L(\theta, i)}{\partial \theta} \quad (27)$$

where ψ is the flux linkage, i is the current, and L is the inductance seen by the stator coils. If the average derivative of inductance over the conduction period of a phase is defined as:

$$D\hat{L}_{Iss} = \left(\int_{\theta_{OFF}}^{\theta_{ON}} \frac{\partial L(\theta, I_{SS})}{\partial \theta}\right)/(\theta_{ON} - \theta_{OFF}) \quad (28)$$

where the hated values are the average values. Combining Equations (25) and (28) provides the average speed produced:

$$\omega_{ss}=i^2 D\hat{L}_{Iss}/2B \quad (29)$$

If this is the case, the steady state current can be calculated as:

$$i_{ss}=\sqrt{2\hat{T}_e/D\hat{L}_{Iss}}=\sqrt{2B\omega/D\hat{L}_{Iss}} \quad (30)$$

This defines the relationship between current and torque at speeds below pulse mode. To obtain the current requirement to produce a certain torque, the co-energy calculations can also be used. Also, the value can be derived experimentally by applying a constant current and measuring the average steady state speed.

During the conduction period, the inductance will have its minimum and maximum value based on the torque equation. As the value of the inductance changes so will the torque of the constant current of a state. This will give the minimum and maximum torque as:

$$\min(Te|_{Iss}) = \frac{1}{2} \cdot i^2 \cdot \min\left(\frac{\partial L(\theta, Iss)}{\partial \theta}\right) \quad (31)$$

$$\max(Te|_{Iss}) = \frac{1}{2} \cdot i^2 \cdot \max\left(\frac{\partial L(\theta, Iss)}{\partial \theta}\right)$$

There will be a steady state speed ripple associated with applying any one state, and it is important to set the two stats far apart so that there is no overlap between the states. Therefore a condition on the states can be set as:

$$\min(Te|_{I_H}) > \max(Te|_{I_L}) \quad (32)$$

where the IH and IL represent the choice of current for the high and low states.

Given the state definitions for the digital control based on the outlined method, the performance parameters can be derived. Looking first at the sources of speed ripple which can be summed us as: 1) Variation in dL/dθ; 2) Commutation; and 3) State switching. State switching has by far the largest effect on speed ripple. To quantify the maximum speed ripple the worst case scenario is assumed. If the motor speed is just below the switching plane, the maximum speed attainable is:

$$\omega(t = T_P) = \omega^* + \delta\omega_H = \hat{\omega}_H\left(1 - e^{-\frac{B \cdot T_P}{J}}\right) + \omega^* e^{-\frac{B \cdot T_P}{J}} \quad (33)$$

Similar calculation for the minimum speed gives the final speed ripple as:

$$\Delta\omega = \delta\omega_H - \delta\omega_L = (\hat{\omega}_H - \hat{\omega}_L)\left(1 - e^{-\frac{B \cdot T_P}{J}}\right) \quad (34)$$

Next, the rise time can be calculated by utilizing the fact that the controller will apply high states until the reference speed is reached. Therefore the rise time can be calculated from the solution of Equation (23) with zero speed as the initial condition:

$$t_r|_{\omega_{SS}} = \tau_m \log\left(1/1 - \frac{\omega_{RATED}}{\omega_H}\right) \quad (35)$$

If the states are changed at commutation points, $T_P = \theta_{COND}/\omega_{ss}$.

Figure 16:
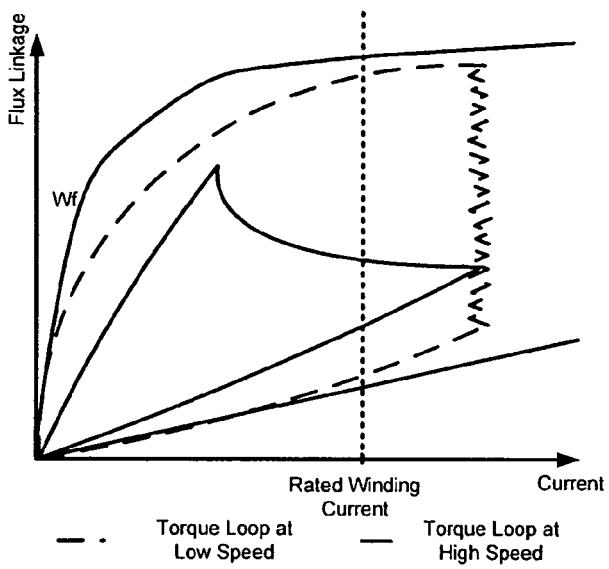
FIG. 16 illustrates co-energy plots for high speed control parameters applied at high and low motor speed.

At high rotational speeds, the rotor is able to cover a larger distance for the same current rise time. Additionally, the effect of back EMF increase causes the current to rise slower for the same bus voltage. Due to these effects, the turn on time needs to be advanced to ensure sufficient torque production. Also, the current should be allowed to spike beyond the rated current of the motor windings to ensure sufficient torque production as shown in FIG. 16. Therefore, at high speeds, the SRM needs to be controlled by changing the conduction period while setting the reference current at a high value so as not to interfere with torque production. Since the turn on and off angles of the two states may not be the same, the motor states can only be changed at the beginning of the conduction period. A state is still defined as $\hat{T}_e(\theta_{ON},\theta_{OFF},1_{REF})$ but the current no longer reaches the reference. Therefore, the assumption is made that these states are applied only when the motor is at high speeds and the back EMF is high enough to keep the current low. For this design the torque equation has to be looked at as the co-energy calculation as shown in FIG. 16 and Equation (36).

$$Te = \frac{\partial W_C}{\partial \theta} = \frac{\partial \int \psi di}{\partial \theta} \quad (36)$$

Up to this point, in the derivations of the digital control technique, it has been assumed that the load torque is always zero. The load torque can be looked at as a disturbance to the system which moves the motor from the commanded state. Digital control has the ability to reject disturbances due to the state switching nature of the control.

Figure 17:
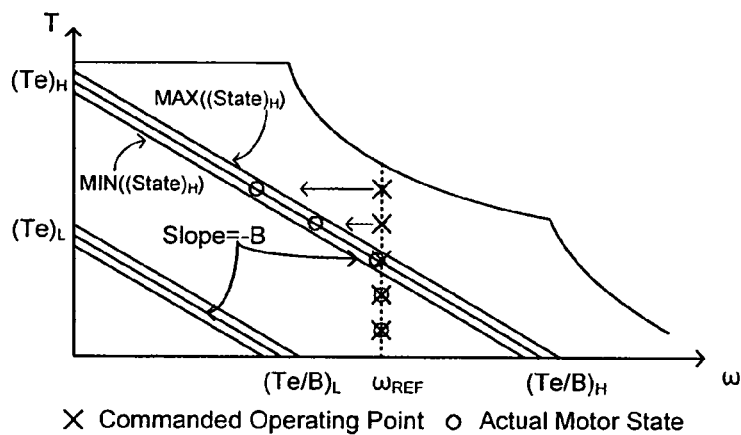
FIG. 17 illustrates the disturbance rejection of digital control in one embodiment of this invention.

Looking at Equation (24), if TL is set at zero and at Te, a line can be traced through the torque speed plane representing the operating points of the motor excited by a state as the torque load increases. The slope of this line is −B. Considering Equation (31) the torque the torque ripple can also be considered. This is shown diagrammatically in FIG. 17. For any two states chosen by the digital control. Based on FIG. 17, the digital control unit of this invention is able to actuate any operating point which is within $(Te)_L$-$(Te/B)_L$-$(Te/B)_H$-$(Te)_H$. If the operating point is above or below this region the actual operating point will be along the $(Te/B)_H$-$(Te)_H$ or $(Te)_L$-$(Te/B)_L$ line respectively, as shown in FIG. 12.

Figure 18:
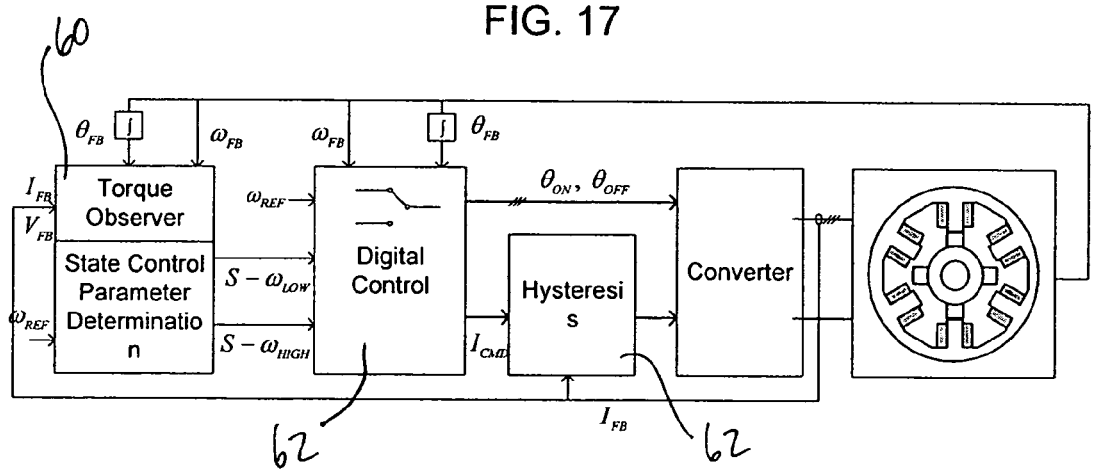
FIG. 18 is a block diagram of an SRM controller according to one embodiment of the invention.

A block diagram of an SRM controller according to one embodiment of the invention is shown in FIG. 18. Information from a state observer 60 is utilized in a state control parameter determination. The current in the active phase, and position and speed of the motor are fed back to the digital controller 62. Based upon the speed feedback, a low or a high state is commanded to the hysteresis current regulator 62.

To demonstrate the digital control in an SRM, a simulation of a 300 W SRM according to the parameters of Table 2 was performed. First, the digital controller operation in current control mode at low speeds was validated. Based upon the performance targets, the digital control parameters were determined using the design equations outlined above. Performance targets and control parameters set as shown in Table 3.

TABLE 2

Motor Parameters

| Attribute | Symbol | Specification |
|---|---|---|
| Stator Resistance | R | 7.25 Ohms |
| Motor Inertia | J | 4.709 e-4 kgm2 |
| Motor Friction | B | 0.02 Nms |
| Unaligned Inductance | Lu | 0.0357 H |
| Aligned Inductance | La | 0.3 H |

TABLE 3

Application Requirements and Digital Control Parameters

| Attribute | Specification |
|---|---|
| Reference Speed | 100 rev/sec |
| Maximum Expected Torque Disturbance | 0.2 Nm |
| Steady state Ripple | <+2% |
| High digital control state | 3.2A or 110 rad/s |
| Low digital control State | 2.6A or 90 rad/s |

Figure 19:
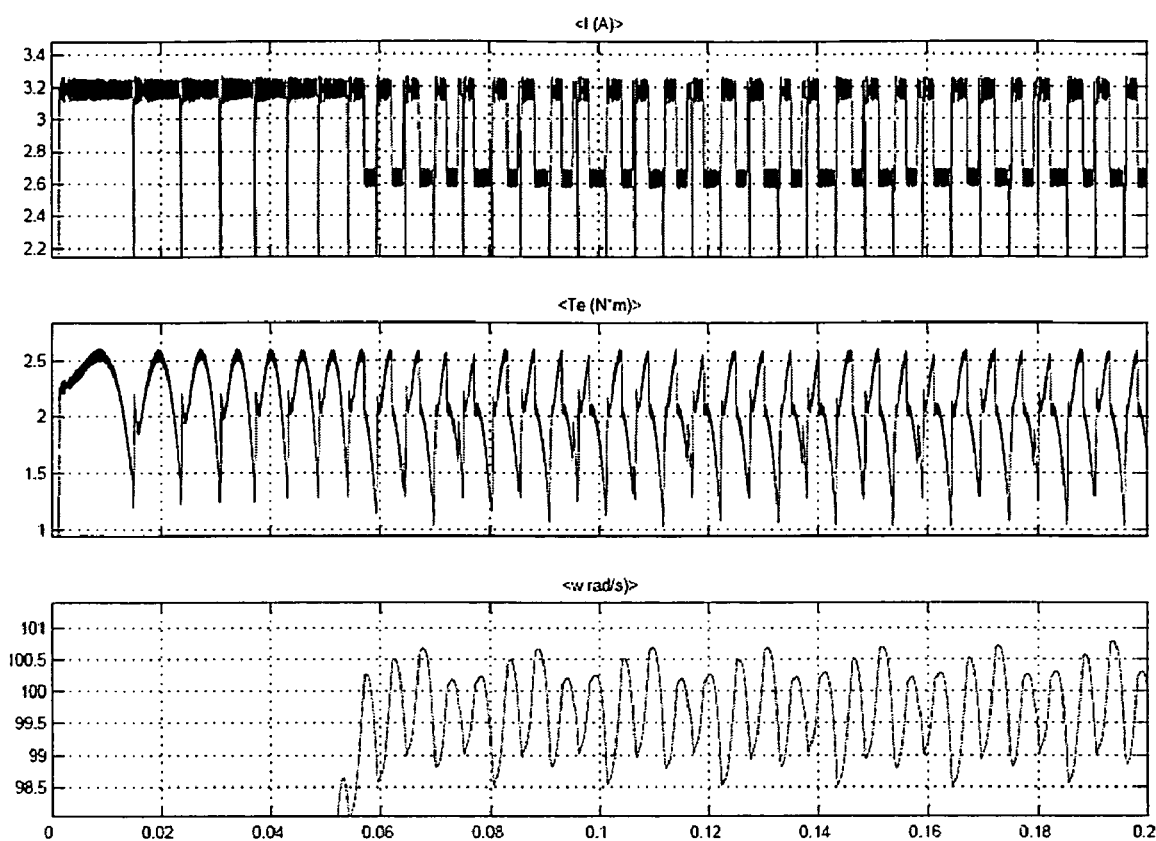
FIG. 19 is a graphical representation of motor speed response.
Figure 20:
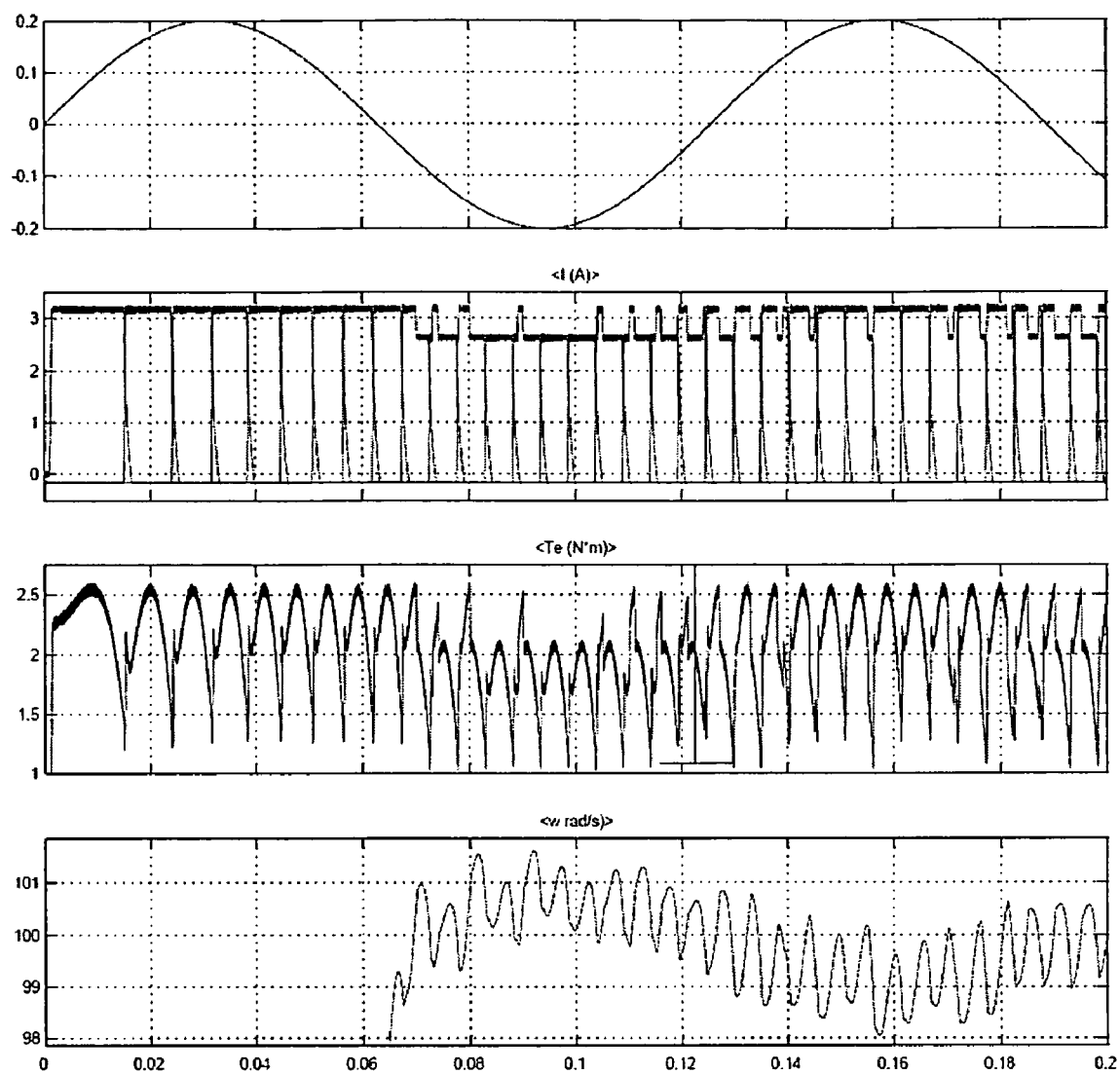
FIG. 20 is a graphical representation of motor speed response with 0.2 Nm sinusoidal torque disturbance.

The ramp up of the motor speed to the target of 100 rad/s is shown in FIG. 19. The steady state speed ripple was less than +/−2 rad/sec, which was within the two percent target. A sinusoidal disturbance with the magnitude of 0.2 Nm and frequency of 50 rad/sec is applied to the motor. As can be seen in FIG. 20, the ripple is within the design boundaries.

Another set of simulations was performed to prove the operation of the digital controller at high speeds. In pulse mode, the control parameters can be determined only via simulations or experimentally. It was shown that for the motor in question the motor can be controlled to a speed of 180 and 220 rad/s by exciting the motor with the following parameters:

LowState: $\theta_{ON}$=52.5° $\theta_{OFF}$=80.0°

HighState: $\theta_{ON}$=58.0° $\theta_{OFF}$=80.0°

Figure 21:
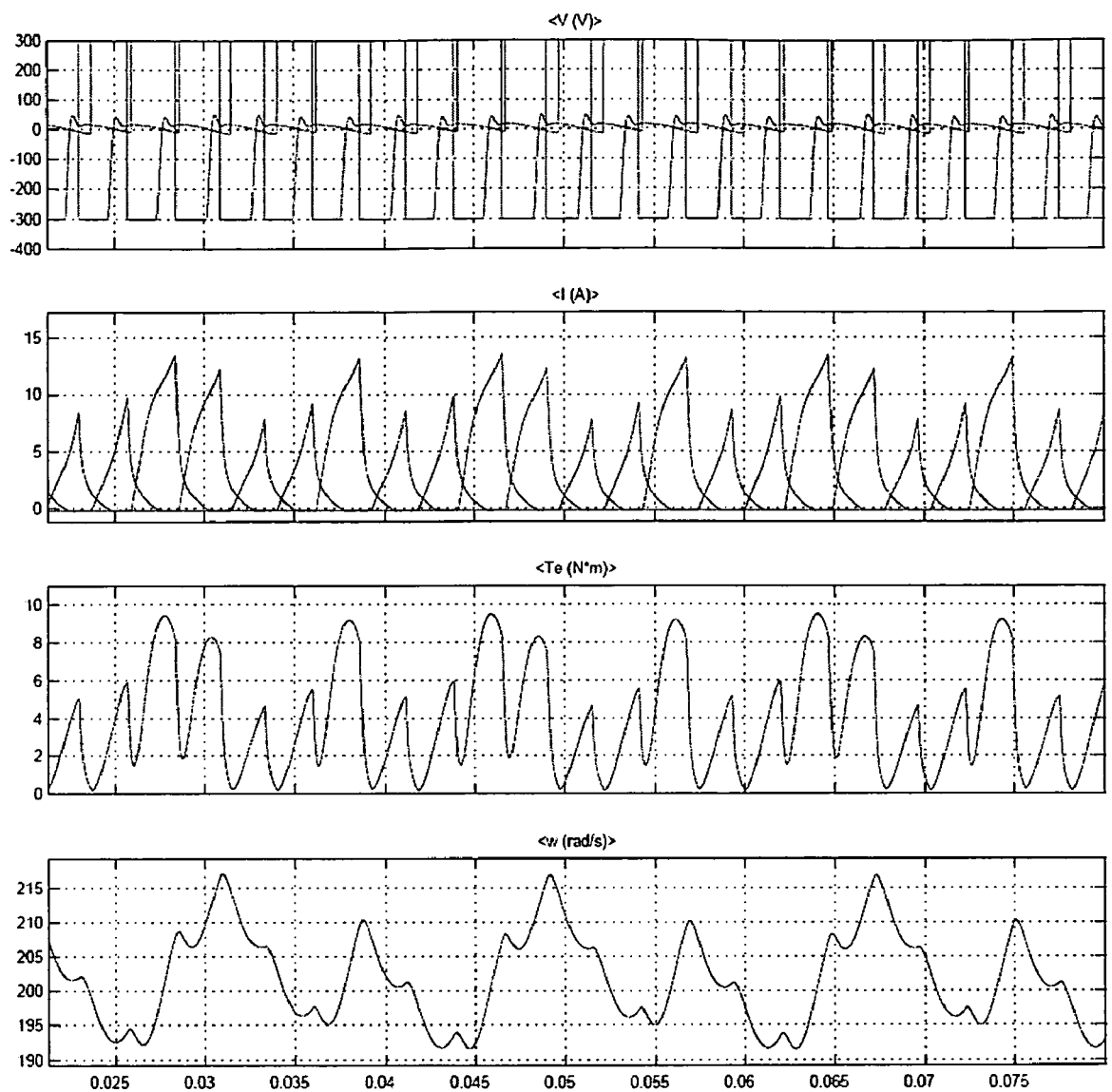
FIG. 21 is a graphical representation of high speed operation at 200 revs/sec.

State switching between these two states keeps the motor at 200 rpm as shown in FIG. 21. Since there is no analytical methodology that can be applied to determining the conduction parameters, it was not possible to determine the speed ripple analytically.

As can be seen, for the motor in question the turn on and off angles were determined as a function of the speed and the torque. The angle determination was crude due to the limited data that was considered. The reason for this was that only a first approximation was required.

The operation at high speeds can be improved if the states are chosen more closely together. It is apparent that when a low state is applied the speed drops substantially—ten revolutions per second—in one conduction period. Therefore, if better performance is required, a more detailed map of speed versus torque as a function of angle is needed.

Further details and information on digital control of SRM can be found in the dissertation of inventor Srdjan Lukic, entitled "Advanced Digital Control Techniques for Switched Reluctance Motor (SRM) Drives" and published 1 Dec. 2007, herein incorporated by reference.

The method further contemplates a method of controlling an electric motor in variable speed and dynamic torque applications including. The electric motor can be, for example, any motor discussed above, and includes a rotor, a stator, a power inverter and a torque load requirement. The state observer senses a torque load and sends a signal based on the torque load requirement to the digital control unit. The digital control unit in turn sends an output signal to the current regulator. The output signal is a digital operation signal of either a first motor operating state or a second motor operating state. The appropriate signal from the current regulator for obtaining the identified speed is sent to the power inverter of the electric motor and used to operate the motor at the selected speed level.

Thus, the invention provides new concept for digital control of motors such as SRM and BLDC motors.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An electric motor controller for controlling variable speed and dynamic torque applications in an electric motor, the electric motor including a rotor, a stator, a power inverter and a torque load requirement, the controller comprising:
    a state observer monitoring the torque load requirement and sending a signal based on the torque load requirement; and
    a digital control unit for receiving the signal from the state observer and sending an output to the electric motor, wherein the output is a value that corresponds to a first motor operating state that is a low torque period or a second motor operating state that is a high torque period.

2. The controller of claim 1 further comprising a current regulator in combination with at least one of the rotor or the stator, wherein the current regulator receives the output from the digital control unit and sends an instruction to the power inverter of the electric motor based on the output.

3. The controller of claim 1, further comprising a position decoder in orientation determining communication with at least one of the rotor and the stator, and the position decoder in signal communication with the current regulator.

4. The controller of claim 1, further comprising a current sensor monitoring each phase of the power inverter and in signal communication with the current regulator.

5. The controller of claim 1, wherein the electric motor is a brushless DC motor or a switched reluctance motor.

6. The controller of claim 5, wherein the switched reluctance motor is polyphase.

7. The controller of claim 5, wherein the brushless DC motor comprises pseudo trapezoidal back-EMF.

8. The controller of claim 1, wherein the state observer predicts torque load based on using a feed forward strategy.

9. The controller of claim 1, wherein the first motor operating state comprises a first speed and the second motor operating state comprises a second speed, wherein the second speed is greater than the first speed.

10. The controller of claim 1, wherein the digital control unit sends the output based on current control or on angle control of the electric motor.

11. The controller of claim 1, wherein the digital control unit sends the output based on current control over a first range of operating speeds of the electric motor and sends the output based on angle control over a second range of operating speeds of the electric motor, wherein the second range of operating speeds of the electric motor is greater than the first range of operating speeds of the electric motor.

12. The controller of claim 11, wherein the electric motor is a switched reluctance motor.

13. A method of controlling an electric motor in variable speed and dynamic torque applications, the electric motor including a rotor, a stator, a power inverter and a torque load requirement, the method comprising:
   sensing a toque load with a state observer and sending a signal based on the torque load requirement;
   receiving the signal from the state observer in a digital control unit and sending as an output from the digital control unit to a current regulator based on an input from the state observer a first motor operating state that is a low torque period or a second motor operating state that is a high torque period; and
   sending a signal from the current regulator to the power inverter of the electric motor based on the output from the digital control unit.

14. The method of claim 13, further comprising detecting with a position decoder an orientation of at least one of the rotor or the stator, the position decoder in signal communication with the current regulator.

15. The method of claim 13, further comprising
   monitoring each phase of the power inverter with a current sensor in signal communication with the current regulator.

16. The method of claim 13, wherein the output signal of the digital control unit is a value for a first operating state of the electric motor or value of a second operating state of the electric motor, wherein the second operating state of the electric motor is a higher rotor speed than the first operating state of the electric motor.

17. The method of claim 13, wherein the digital control unit sends the output based on current control over a lower motor operating speed range and sends the output based on angle control over a higher motor operating speed range.

18. The method of claim 13, wherein the electric motor comprises a brushless DC motor or a switched reluctance motor.

19. The method of claim 18, wherein the brushless DC motor comprises pseudo trapezoidal back-EMF.

20. An electric motor controller for controlling variable speed and dynamic torque applications in an electric motor, the electric motor including a rotor, a stator, a power inverter and a torque load requirement, the controller comprising:
   a state observer monitoring the torque load requirement and sending a signal based on the torque load requirement;
   a digital control unit receiving the signal from the state observer and sending an output to the electric motor, wherein the output is selected from two operating states including a first motor operating state and a second motor operating state, the first motor operating state including a low torque period with a low motor speed and the second motor operating state including a high torque period with a high motor speed; and
   wherein the digital control unit alternates between the first motor operating state and the second motor operating state to obtain an average speed equal to a command speed.

* * * * *